2,891,955

PROCESS OF MANUFACTURING ISOQUINOLIN-IUM AND 5,6,7,8-TETRAHYDRO-ISOQUINOLIN-IUM SALTS

Jan Thesing, Trautheim, uber Darmstadt, Germany, assignor to E. Merck Aktiengesellschaft, Darmstadt, Darmstadt, Germany, a corporation of Germany No Drawing. Application November 18, 1957
Serial No. 696,916

Claims priority, application Germany November 23, 1956

11 Claims. (Cl. 260—286)

N-[β-(indolyl-3)-ethyl] isoquinolinium salts (Formula I) are particularly favorable starting materials for the preparation of indolo-(2,3a) quinolizines of Formula II

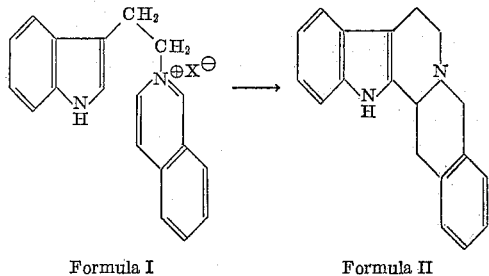

Formula I        Formula II (B. Belleau, Chem. and Ind. 1955, 229; K. T. Potts and R. Robinson, J. Chem. Soc., London, 1955, 2675.) Compounds of Formula II have the basic skeleton of numerous indolalkaloids, as, for example, yohimbine and reserpine.

Two processes have heretofore been available for the preparation of the aforesaid isoquinolinium salts, to wit: (1) the interaction of 3-(β-bromo-ethyl)-indole (obtained from tryptophol and phosphorous tribromide) with isoquinoline (B. Belleau, Chem. and Ind., 1955, 229); and (2) the interaction of homophthaldialdehyde and tryptamine (K. T. Potts and R. Robinson, J. Chem. Soc., London, 1955, 2675).

Both of these methods can be carried out only with difficulty or with poor yields from the available starting materials. There has been lacking, up to the present time, a simple method for producing the aforesaid isoquinolinium salts.

In accordance with the present invention, one can successfully obtain, in simple fashion and with practically quantitative yield, the N-[β-(indolyl-3)-ethyl] isoquinolinium salts or the corresponding 5,6,7,8-tetrahydro isoquinolinium salts. This success can be achieved from the interaction of: (a) the addition product of α-halogeno-carbonyl compounds with isoquinoline, as, for example, N-phenacyl-isoquinolinium salts (Formula III) (under the influence of basic catalysts, as, for example, sodium hydroxide, barium hydroxide, calcium hydroxide) with (b) a trialkyl-skatyl-ammonium salt, as, for example, the readily available trimethyl-skatyl-ammonium methyl sulphate (Formula IV) (C. Schoepf and J. Thesing, Angew. Chemie 63, 377 (1951)), which forms the corresponding skatyl derivative (Formula V).

The thus obtained alkylated product (Formula V) need not be isolated. The reaction mixture can be subjected to the action of the alkali directly to yield the desired isoquinolinium salt (Formula I) and the carboxylic acid (in this instance benzoic acid) which is hydrolytically split off.

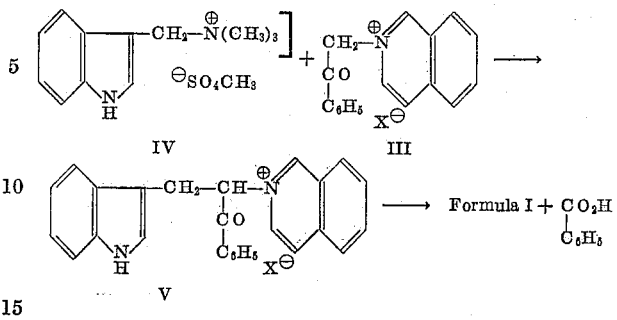

The skatyl-ammonium salts quaternated with lower alkyl rests are specially suitable as trialkyl-skatyl-ammonium salts, as, for example, diethyl-methyl-skatyl-ammonium methyl sulphate, but also cycloalkyl-skatyl-ammonium salts, such as, N-methyl-N-skatyl-piperidinium methyl sulphate may be used as primary materials. Reaction may also be made with alkyl or alkoxy substituted N-phenacyl-isoquinolinium salts, as, for example, N-phenacyl-6,7-dimethoxy-isoquinolinium bromide or N-phenacyl-4-methoxy-isoquinolinium bromide. The reactions of course also work when using the corresponding chlorides or iodides, as, for example, N-phenacyl-isoquinolinium chloride or iodide. Practical advantages will result when using the described bromides for the reactions. In place of III, there may be used compounds in which the 1,3,4,5,6,7 or 8 positions of the N-phenacyl-isoquinolinium salt are substituted. Furthermore, there can be used instead of the isoquinolinium salts, the corresponding 5,6,7,8-tetrahydro isoquinolinium salts.

The isolation of compounds of the general Formula I is not only possible as iodides but essentially all those salts are suitable with a solubility low enough to permit crystallization from the resulting mixture; so, for instance, the compounds may also be isolated as bromides or perchlorates. The thus readily obtainable isoquinolinium salts are highly desirable and/or valuable intermediates for further synthesis of pharmacologically active substances.

EXAMPLE 1

N-[β-(indolyl-3)-ethyl] isoquinolinium iodide

A solution of 2.0 m. moles of trimethyl-skatyl-ammonium methyl sulphate and 2.2 m. moles of N-phenacyl-isoquinolinium bromide in 20 cc. of methanol are interacted, at room temperature, with a methanolic solution of 4.0 m. moles of barium hydroxide whereby a deep red color is developed. The reaction mixture is allowed to stand for 5 minutes at room temperature and neutralized with a 50% aqueous solution of acetic acid (a slight lightening of the color ensues). The mixture is then concentrated to a volume of 6 cc.; and 5 m. moles of potassium iodide in 1 cc. of water is added thereto. A precipitation of N-[β-(indolyl-3)-ethyl]-isoquinolinium iodide takes place (99% of the theoretical). The compound, upon recrystallization from methanol, has a melting point of 242°–244.5° C.

EXAMPLE 2

N-[β-(indolyl-3)-ethyl]-5,6,7,8-tetrahydro isoquinolinium iodide

The N-phenacyl-benzhydro-isoquinolinium bromide used as a starting material is prepared from 5,6,7,8-tetrahydro isoquinoline and phenacyl bromide. Its melting point, when recrystallized from isopropyl alcohol, is 209°–210° C.

A solution of 10 m. moles of trimethyl-skatyl-ammonium methyl sulphate and 11 m. moles of N-phenacyl-5,6,7,8-tetrahydro isoquinolinium bromide in 20 cc. of methanol are reacted at room temperature with 5 cc. of 2 N aqueous sodium hydroxide. The reaction mixture is allowed to stand for 1 minute at room temperature, then warmed for 5 minutes to 70° C. The cooled mixture is then neutralized with 2 N acetic acid; and 25 m. moles of potassium iodide in 4 cc. of water are added to the solution. Upon rubbing with a glass rod, the N-[β-(indolyl-3)-ethyl]-benzhydro-isoquinolinium iodide crystallizes out (89% of the theoretical). Upon concentration of the mother liquor, a further 10% of the compound is obtained. The compound, upon recrystallization from methanol, has a melting point of 222°–223° C.

EXAMPLE 3

*N-[β-(indolyl-3)-ethyl]-4-methoxy-isoquinolinium iodide*

The solution of 0.632 gm. (0.002 mol) trimethyl-skatyl-ammonium iodide (prepared according to C. Schöpf and J. Thesing, Angewandte Chemie, 63, 377 (1951)) and 0.79 gm. (0.0022 mol) N-phenacyl-4-methoxy-isoquinolinium bromide (prepared by heating of 1.6 gm. 4-methoxy-isoquinoline and 2.0 gm. phenacyl bromide in 25 cc. absolute benzene for two hours to the B.P., M.P. 173°–175° C. (decomp.) from acetone.) in 20 cc. methanol is treated with 2.16 m. mol methanolic KOH and a deep orange colour develops. The reaction mixture is kept for 5 min. at room temperature, 0.00324 mol methanolic KOH are added and heated to the B.P. on a steambath. Subsequently, the mixture is neutralized with 7 cc. glacial acetic acid, the methanol evaporated in a vacuum to about 5 cc. and the precipitated N-[β-(indolyl-3)-ethyl]-4-methoxy-isoquinolinium iodide sucked off. M.P. from methanol 227–228° C.

EXAMPLE 4

*N-[β-(indolyl-3)-ethyl]-4-methoxy-isoquinolinium bromide*

0.00216 mol methanolic KOH are added to the solution of 0.002 mol trimethyl-skatyl-ammonium methyl sulphate and 0.0022 mol N-phenacyl-4-methoxy-isoquinolinium chloride at room temperature (the hygroscopic substance is obtained by heating equimolar amounts of 4-methoxy-isoquinoline with phenacyl chloride in benzene, M.P. 171–173° C.) and kept for 5 min. at room temperature. Then again 0.00324 mol methanolic KOH are added, the mixture heated for 15 min. to 70° C., acidified with 2.5 cc. glacial acetic acid, 0.0022 mol KBr added and evaporated to 5 cc. Upon cooling with ice the N-[β-(indolyl-3)-ethyl]-4-methoxy-isoquinolinium bromide will crystallize in 86% yield of M.P. 200–203° C.

From an alcoholic solution of this bromide the N-[β(indolyl-3)-ethyl]-4-methoxy-isoquinolinium perchlorate M.P. 170–173° C. (from methanol) may be obtained.

EXAMPLE 5

*N-[β(indolyl-3)-ethyl]-6,7-dimethoxy-isoquinolinium iodide*

A solution of 0.060 gm. KOH in 10 cc. methanol is added to the solution of 0.001 mol trimethyl-skatyl-ammonium methyl sulphate and 0.001 mol N-phenacyl-6,7-dimethoxy-isoquinolinium bromide (prepared by heating 0.005 mol 6,7-dimethoxy-isoquinoline with 1.0 gm. phenacyl bromide in benzene; M.P. from ethanol 121–122.5° C.) in 20 cc. methanol is kept for 5 min. at room temperature, additional 0.00162 mol methanolic KOH are added and heated for 15 min. on a steambath. Subsequently, the mixture is acidified with 3.5 cc. glacial acetic acid, concentrated to 5 cc. in a vacuum and the solution of 0.42 gm. KI in 1 cc. water is added to the warm solution, the N-[β-(indolyl-3)-ethyl]-6,7-dimethoxy-isoquinolinium iodide precipitating as a sparingly soluble salt in practically quantitative yield. M.P. from water 247–248° C. (decomp.).

It will be understood that the foregoing description of the invention and the examples set forth are merely illustrative of the principles thereof. Accordingly, the appended claims are to be construed as defining the invention within the full spirit and scope thereof.

I claim:

1. A process for manufacturing salts of the class of isoquinolinium and 5,6,7,8-tetrahydroisoquinolinium salts which comprises reacting a trialkyl skatyl ammonium salt, wherein the anion is a member of the group consisting of halides and lower alkyl sulfuric acid radicals, in the presence of a basic compound selected from the group consisting of hydroxides of alkali and alkaline earth metals, with a compound of the general formula

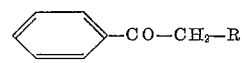

wherein R is a member of the group consisting of isoquinolium halides, isoquinolinium halides substituted by lower alkoxy radicals, 5,6,7,8-tetrahydroisoquinolinium halides and 5,6,7,8-tetrahydroisoquinolinium halides substituted by lower alkoxy radicals and hydrolytically splitting the obtained skatyl compound.

2. Process in accordance with claim 1 wherein a trialkyl-skatyl-ammonium salt is reacted with a member of the group consisting of isoquinolinium halides and isoquinolinium halides which are substituted by lower alkoxy radicals.

3. Process in accordance with claim 1 wherein a trialkyl-skatyl-ammonium salt is reacted with a member of the group consisting of 5,6,7,8-tetrahydroisoquinolinium halides and 5,6,7,8-tetrahydroisoquinolinium halides which are substituted by lower alkoxy radicals.

4. A process for manufacturing salts of the class of isoquinolinium and 5,6,7,8-tetrahydroisoquinolinium salts which comprises reacting a trimethyl skatyl ammonium salt, wherein the anion is a member of the group consisting of halides and lower alkyl sulfuric acid radicals, in the presence of a basic compound selected from the group consisting of hydroxides of alkali and alkaline earth metals, with a compound of the group consisting of N-phenacyl-isoquinolinium halides and N-phenacyl-isoquinolinium halides substituted by lower alkoxy group; and hydrolytically splitting the obtained skatyl compound.

5. A process according to claim 4, wherein a trimethyl skatyl ammonium salt is reacted with a member of the group consisting of N-phenacyl-5,6,7,8-tetrahydro-isoquinolinium-halides and N-phenacyl-5,6,7,8-tetrahydro-isoquinolinium-halides substituted by lower alkoxy radicals; and hydrolytically splitting the obtained skatyl compound.

6. A process according to claim 4 wherein the trimethyl skatyl ammonium salt is a trimethyl skatyl ammonium halide.

7. A process according to claim 5, wherein the trimethyl skatyl ammonium salt is a trimethyl skatyl ammonium halide.

8. A process according to claim 4, wherein the trimethyl skatyl ammonium salt is trimethyl skatyl ammonium methyl sulphate.

9. A process according to claim 5, wherein the trimethyl skatyl ammonium salt is trimethyl skatyl ammonium methyl sulphate.

10. A process for manufacturing N-[β-(indolyl-3)-ethyl]-4-methoxy-isoquinolinium halides, which comprises reacting a trialkyl skatyl ammonium salt, wherein the anion is a member of the group consisting of halides and lower alkyl sulfuric acid radicals, in the presence of a basic compound selected from the group consisting of hydroxides of alkali and alkaline earth metals, with an N-phenacyl-4-methoxy-isoquinolinium halide; and hydrolytically splitting the obtained skatyl compound.

11. A process for manufacturing N-[β-(indolyl-3)-ethyl]-6,7-dimethoxy-isoquinolinium iodide, which comprises reacting a trialkyl skatyl ammonium salts, wherein the anion is a member of the group consisting of halides and lower alkyl sulfuric acid radicals, in the presence of a basic compound selected from the group consisting of hydroxides of alkali and alkaline earth metals, with an N - phenacyl - 6,7 - dimethoxy - isoquinolinium halide; and hydrolytically splitting the obtained skatyl compound.

No references cited.